Nov. 10, 1959  L. A. B. PILKINGTON ET AL  2,911,759
MANUFACTURE OF FLAT GLASS
Filed Dec. 6, 1954  3 Sheets-Sheet 1
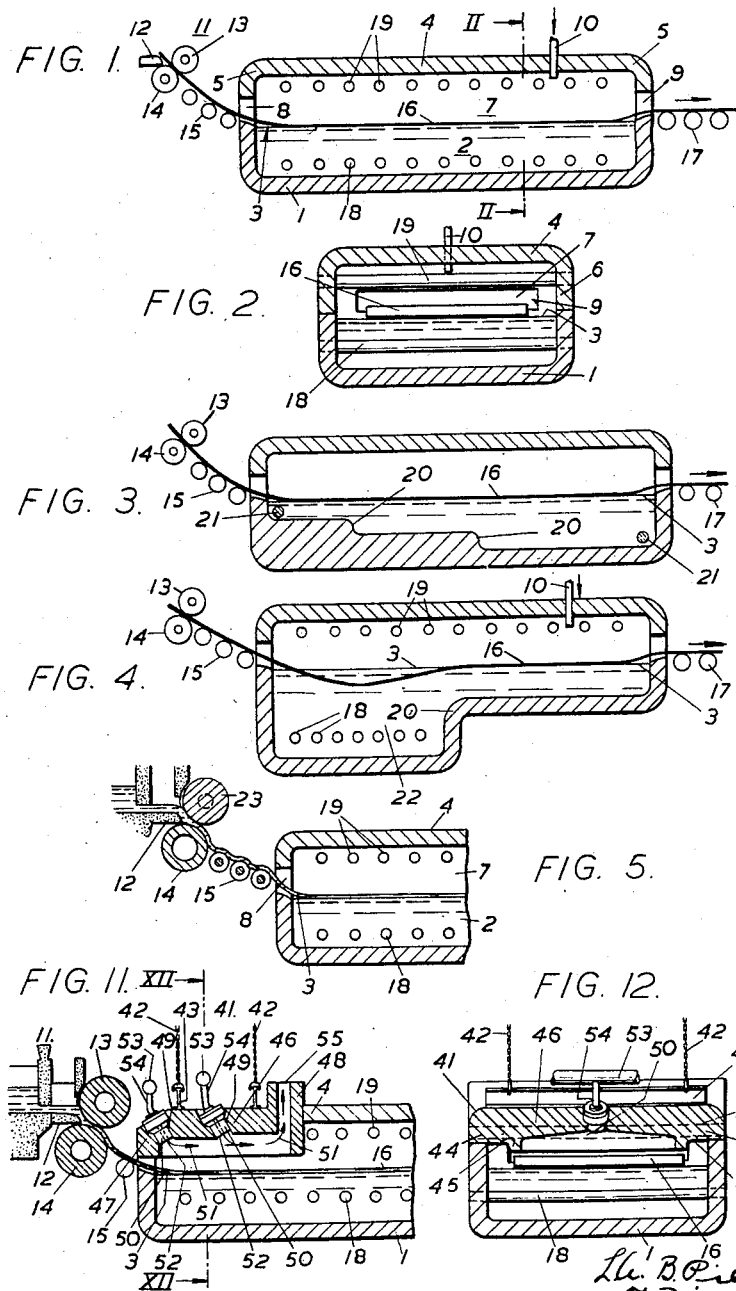

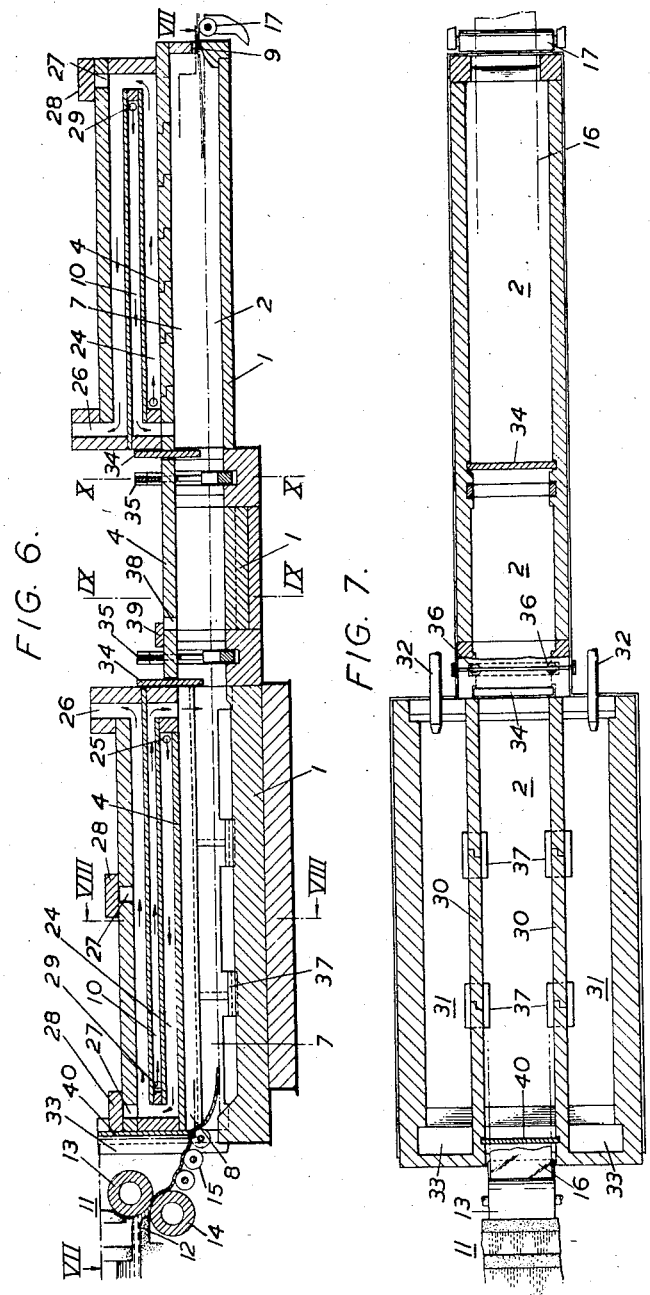

Nov. 10, 1959    L. A. B. PILKINGTON ET AL    2,911,759
MANUFACTURE OF FLAT GLASS

Filed Dec. 6, 1954    3 Sheets-Sheet 3

United States Patent Office 2,911,759
Patented Nov. 10, 1959

2,911,759

MANUFACTURE OF FLAT GLASS

Lionel A. B. Pilkington, Rainhill, and Kenneth Bickerstaff, Moss Bank, St. Helens, England, assignors to Pilkington Brothers Limited, Liverpool, England, a British company Application December 6, 1954, Serial No. 473,358

Claims priority application Great Britain December 10, 1953

14 Claims. (Cl. 49—3)

This invention relates to the manufacture of flat glass in continuous ribbon form.

In the manufacture of flat glass in continuous ribbon form a usual practice is to flow the molten glass from a spout of a tank furnace in which the glass batch is melted, to the pass between sizing rolls which are driven at a peripheral speed which is substantially the same as the speed of the ribbon of glass which emerges from the rolls. These rolls are of greater length than the width of the ribbon and as the molten glass passes between them, they squash it to form a ribbon of the desired thickness. The rolls are mounted for mutual adjustment to regulate the distance between their peripheries, which distance determines the thickness of the ribbon emerging from the rolls. This operation is sometimes referred to as "sizing."

During this operation of sizing the ribbon, the glass passes in intimate contact with the metal of the two rolls and accordingly a heat exchange is effected between the surfaces of the ribbon and the rolls which may be more severe on the underface of the ribbon so that the surfaces of the glass are cooled by loss of heat due to heat transfer to the rolls and thus stiffened and are permanently harmed by their contact with the rolls.

The ribbon is usually supported immediately after formation by a metal apron, or by a series of rollers, which directs the ribbon to a lehr in which the glass is annealed and thereby conditioned for presentation, in a continuous process, to grinders, and sometimes to polishers which operate on the glass after the grinding stages have been completed. To make the glass transparent, both faces must be ground and polished.

In the process of advancing the ribbon from the sizing rolls, further heat exchanges occur between the underface of the ribbon of glass and the apron or rollers, so that before the glass arrives at the rollers which direct the ribbon into the lehr, it is sufficiently chilled to be passed over the rollers in the lehr.

A main object of the present invention is to improve the manufacture of flat glass in continuous ribbon form so that a better surface and flatness are obtained for the glass before annealing than have heretofore been achieved at such stage of production.

A further main object is to obtain a greater rate of producing sheet glass than is at present possible by the usual commercial drawing methods.

Another main object of the present invention is to produce flat glass in ribbon form, the faces of which have a lustre of a quality such as that known as "fire finish," on emerging from the annealing stage.

Still another important object of the invention is to produce by rolling methods that flat glass known as window glass, whereby the finished product is transparent and has a high quality lustre.

A method of manufacturing flat glass, in ribbon form, according to the present invention, is characterized by forming a ribbon of glass on a solid surface and causing the ribbon to move along a bath of molten metal the surface of which is wider than the intended ultimate width for the ribbon, in which bath the ribbon becomes supported in a continuous horizontal plane as a floating element, protecting the surface of the molten metal in the bath against oxidation by maintaining a chemically suitable thermally regulated atmosphere thereover and regulating the temperature of the molten bath so that before the ribbon leaves the bath it is chilled sufficiently to be advanced unharmed on mechanismal conveying means.

In constituting the molten bath used for methods of operation according to the present invention, the following characteristics for the bath must be observed:

(1) Melting point below 700° C. Approximately.
(2) Boiling point above 1000° C. (except where the bath is only used as a vehicle to carry the ribbon).
(3) Metal must be denser than glass.
(4) Metal must not stick to glass or react chemically with it to any great extent.

Obviously the metal used in the bath must be substantially inert with respect to the material from which the confining tank is made and substantially inert to the atmosphere above the bath and in any case, must be substantially incapable of forming reaction products which would adversely affect the quality of the glass.

Experiments have shown that of the common pure metals, tin fulfills all the requirements for the bath. Owing to the high cost of tin, other metals and alloys may be contemplated for reasons of economy. Lead, for instance, fulfills the above requirements but has the disadvantage that in spite of its cheapness, it necessitates a plant for disposing of any toxic fumes which might be generated at the temperatures at which the methods of operation herein described are carried out. The known thermal conductivity of tin, which results in even heat treatment of the glass floated thereon, makes tin a suitable material; and in preferred constructions according to the invention, the molten bath is constituted by tin.

As an alternative to using a pure metal, an alloy, for example of tin and lead, may be employed, the alloy used having a specific gravity such that a ribbon of glass passing across the bath so constituted is in a buoyant state, the alloy being inert with respect to the glass.

By such method of operation, the stiffening of the ribbon of glass is effected whilst the glass is supported by the smooth vehicle constituted by the molten metal.

In accordance with the invention, the ribbon which is flowed to the bath may be produced on a casting roll, in which case a temperature gradient is maintained in the bath to cause the surface of the molten ribbon chilled by the casting roll to be remelted and then again chilled to a condition in which the surface is stiffened whilst the ribbon is in a buoyant state on the metal, so that the ribbon can be carried unharmed on mechanical conveying means.

Alternatively, the ribbon may be produced between sizing members (e.g. sizing rolls) and floated along the bath of molten metal and the thermal conditions in the bath and over the bath are such that during the passage of the ribbon along the bath, a superficial melting of the ribbon surfaces occurs before the chilling treatment, so that the chilling treatment is effected on the melted glass surfaces and a fire finish of the surfaces is obtained.

Experiments have shown that the glass surface in contact with molten tin passes to the chilling stages under such controlled conditions of heat exchange that the surface in cantact with the molten tin acquires a lustre equivalent to a fire finish such as that of the surfaces of drawn sheet glass.

From the foregoing, it will be appreciated that the invention is particularly useful in improving the known method of manufacturing rolled flat glass in which sizing rolls are employed, and constitutes a novel method of and apparatus for manufacturing window glass by a casting process.

When no re-heating of the ribbon is desired, the molten state of the bath may be solely maintained by the passage of the hot ribbon through the bath. However, heaters may be disposed above the ribbon so as to direct heat on to the ribbon and thereby increase the heat imparted to the bath by the passage of the ribbon.

By regulating the temperature of the bath, the ribbon may be re-heated sufficiently to eliminate any undulations which may have been imparted to it by any inaccuracies in the sizing rolls or during the passage of the ribbon over rollers disposed between the casting rolls and the bath.

In producing flat glass in accordance with the present invention the required temperature in the bath may be produced by constituting a lateral lane in the bath and segregating the atmosphere above the lateral lane from the remainder of the bath and applying heat to the lateral lane and transferring heat from the lateral lane by conduction and convection through the bath to that part of the bath along which the glass is floating.

The molten metal in the lateral lane may be protected from oxidation by disposing a protective layer of heat transmitting material over the molten metal in the lateral lane, and the protective layer may be constituted by a layer of refractory tiles, molten glass or slag, and if refractory tiles are used the joints between them may be sealed by molten glass.

Although the invention is of particular use in improving the rolled ribbon of flat glass produced in the customary manner by sizing rolls, a ribbon of glass to be treated in accordance with the present invention may be flowed from a spout of a glass melting furnace on to a casting roll on which the ribbon is first formed, as hereinafter fully described. In such case, co-operating rollers are disposed to engage and grip the margins of the ribbon on the roll in order to chill the marginal edges of the ribbon produced, and thereby positively define the actual width of the ribbon, and to drive forward the ribbon. Further, the control of the formation of the margins of the ribbon, however produced, may be assisted by locating coolers in the bath to each side thereof, or above the bath to each side of the ribbon.

A rolled ribbon of glass treated in accordance with the invention may be directed into the bath so that the ribbon is immersed, and thereby both faces heated by contact with the molten metal so that there is a re-melting of both surfaces to compensate for the loss of heat by conduction in passing between sizing rolls.

The present invention also comprises apparatus for producing flat glass according to the methods of manufacture hereinbefore referred to, such apparatus being characterized by a tank extending forwardly from a ribbon forming means in the direction of movement of the ribbon, a bath of molten metal in said tank disposed to receive and float the ribbon as it is advanced from the forming means, a tunnel bridging the bath, temperature regulating means associated with the bath whereby the ribbon may receive a desired thermal treatment and conveying supports for the ribbon as it emerges from the bath after the completion of the thermal treatment.

Ducting may be provided for admitting chemically suitable gas into the tunnel and means for regulating the temperature of the gas within the tunnel to correspond with the regulation of the temperature of the bath.

For producing flat glass with a lustrous finish, a heater is disposed to impart heat to the molten metal at the feeding end of the bath to cause surface melting of the glass, a tunnel bridging the bath, and heating means disposed in the headspace for heating the headspace over the bath, and obstructing means regulating the conduction of heat along the bath and along the headspace thereover.

Apparatus according to the invention may comprise parallel longitudinal walls dipping into the molten metal and segregating a surface lane of the bath, extending along the path of the moving ribbon, from the bath surface outside the lane, a roof connecting the said walls so that the buoyant ribbon moves through a tunnel, heating means directing heat on to the roof whereby radiant heat is directed on to the bath, and heating means associated with the molten metal outside the lane whereby the heat imparted is conducted through the bath to the molten metal in the lane.

The heating means may be located above the said roof disposed to impart heat to the roof whereby the latter is caused to radiate heat downwardly into the headspace over the lane through which the buoyant ribbon moves.

Preferably the bath is consituted by molten tin, and the roof forms the floor of a flue for hot products of combustion, within which flue is disposed ducting connected at one end to a supply of a non-oxidising gas, the other end of said ducting leading through the roof into the headspace between the roof and the lane through which the buoyant ribbon moves, whereby the desired temperature of the entering gas is produced by heat exchange effected through the ducting wall.

The flue preferably has a plurality of outlets with individual obturators, whereby the effective length of the flue can be adjusted and the extent of said heat exchange thereby regulated.

The tank may be provided with a linear extension, constituted as an extension of the tunnel, a vertically adjustable shutter disposed at each end of the extension whereby flow of the non-oxidising gas from the said headspace in the tunnel into and out of the extension is regulated, and with vertically adjustable weirs, whereby conduction of heat from the molten metal in the lane to the molten metal in the extension and away therefrom is regulated.

Preferably apparatus constructed in accordance with the invention comprises a second linear extension of the said tunnel, the roof thereof forming the floor of a flue for hot products of combustion, within which is disposed ducting connected at one end to a supply of non-oxidising gas, the other end of said ducting leading through this continuation of the roof into the headspace between the roof and the bath and the said roof continuation.

Apparatus according to the invention preferably comprises an arrangement wherein the longitudinal walls of the tank confine a central lane in the tank between a pair of side lanes and the heat applied to the bath in the side lanes is conducted and convected through the bath to the central lane.

As hereinafter more particularly described, the bath, when used as a vehicle for the ribbon emerging from a pair of sizing rolls, may be provided at the inlet end with a superstructure including a heating chamber constructed at the inlet end thereof so that a sheet of flame produced in the heating chamber sweeps over the face of the glass advancing from the rolls.

The molten bath used in processes of manufacture in accordance with the invention may be confined in a shallow tank, that is to say, a tank varying from about one foot to about one inch in depth, and about fifty (50) feet long, the width of the tank being such as to leave a permanent gap between the edge of the ribbon passing through the bath and the walls of the tank, then if chilling means for the ribbon are disposed in the bath, they will be disposed in the space between the sides of the ribbon and the wall of the tank. The length of the bath is dependent on the rate of production and the thermal treatment required.

Experiments have shown that when using tin it is essential to maintain a non-oxidising atmosphere over the bath, and accordingly, means may be provided for introducing the necessary gas, e.g. a reducing gas, through a roof to the bath and to employ a roof structure adapted to maintain the gaseous atmosphere over the bath, thus the roof structure will permit a minimum opening at each end of the tank, so that the loss of gaseous atmosphere is minimised, whilst sufficient space is given for the admission and for the exit of the ribbon to and from the bath.

The molten bath may be heated by an electrical induction system, by immersion heaters, or by electrodes, and to obtain a temperature gradient in the bath so that there is first a re-melting of the underface of the glass, and then a chilling, either the amount of energy supplied to the heaters may be regulated or the depth of the bath regulated, for example, by stepping the floor of the tank as hereinafter described.

In order that the invention may be more clearly understood, some preferred embodiments thereof will now be described by way of example with reference to the accompanying drawings, in which:

Fig. 1 is a diagrammatic drawing illustrating the principle of the invention,

Fig. 2 is a cross-section taken on the line II—II to Fig. 1,

Figure 8:
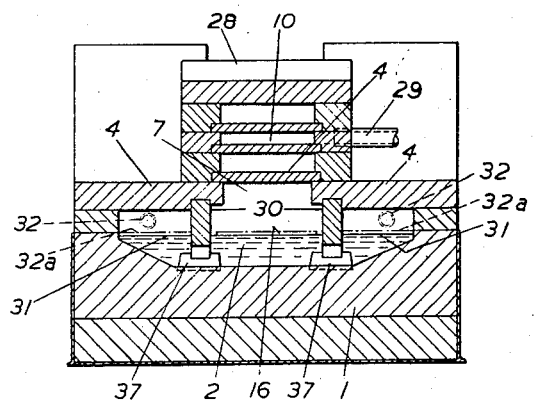
Figure 9:
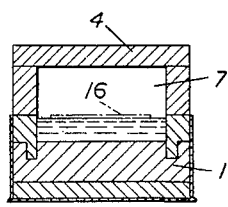
Figure 10:
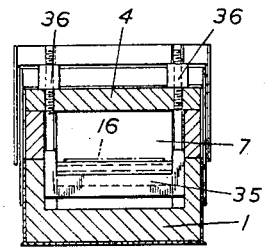

Fig. 3 is a similar view as in Fig. 1, showing a modification in the form of the tank, Fig. 4 shows in sectional elevation a further modification in the form of a tank hereinafter referred to, Fig. 5 is a fragmentary view similar to Figure 1, illustrating modified means of feeding the ribbon to the tank, Fig. 6 shows in sectional elevation one practical form of apparatus in which a ribbon of rolled glass is first heated and afterwards chilled, the apparatus including an intermediate transfer section, Fig. 7 is a sectional view (partly in plan) taken on the line VII—VII of Figure 6, Fig. 8 is a vertical section on the line VIII—VIII of Figure 6, Figs. 9 and 10 are sectional elevations taken on the lines IX—IX and X—X of Figure 6, Fig. 11 is a view similar to Figure 1 showing a modified construction in accordance with the present invention, and Fig. 12 is a sectional elevation on the line XII—XII of Figure 11.

In the drawings like references designate similar parts.

Referring first to Figures 1 to 5 of the drawings.

In these figures, the tank 1 contains a bath 2 of molten tin, the level of which is indicated at 3, and the tank is provided with a roof 4 having end walls 5 and side walls 6 (see Figure 2), so that the roof structure provides a tunnel over the bath enclosing a headspace 7 above the molten bath.

The end walls 5 of the roof structure are so disposed with respect to the corresponding walls of the tank as to provide a narrow inlet 8 and outlet 9, the roof structure being provided with ducting indicated at 10 through which non-oxidising gas is fed into the headspace above the bath. The purpose of introducing the gas is to prevent oxidation on the surface of the molten tin, and to this end a reducing gas such as ordinary coal gas may be supplied through the duct, and to prevent the ingress of atmospheric air a slight plenum is preferably maintained in the headspace 7.

In the drawings, the ribbon forming means is generally indicated at 11, and comprises a customary spout 12 of a melting furnace (not shown) and upper and lower sizing rolls 13, 14 respectively between which the ribbon is formed and driven forwardly by them, and between the sizing rolls and the inlet 8 of the tank are the customary supporting rollers indicated at 15 disposed to lead a ribbon 16 of glass advanced from the sizing rolls through the inlet 8 to the bath 2. As well known in the art an apron (not shown) may be substituted for rollers 15. At the exit end of the tank and in juxtaposition to the base of the outlet 9 are a series of rollers 17 of customary form which lead the stiffened ribbon to a lehr (not shown).

As clearly shown in Figure 2, the tank and the outlet 9 are wider than the ribbon so as to avoid contact of the ribbon with the walls or outlet of the tank.

The tank is provided with thermal regulating means indicated at 18 for controlling the temperature of the bath, which means may be conduits for passing a cooling fluid through the bath, with the object of maintaining the bath at a temperature which will chill the ribbon, before it leaves the bath, to an extent such that the ribbon is sufficiently stiffened to be led up to the outlet 9 and on to and carried by the usual supporting rollers 17, without harming the glass.

By such form of apparatus, a smooth substantially frictionless vehicle is provided which supports the glass ribbon 16 from the moment it leaves the supporting rollers 15 up to the time it is carried by the rollers 17.

To produce a "fire finish" in the glass passing over the bath, the thermal regulating means 18 nearer the entry end of the tank may be immersion heaters so that at the entry end of the bath the temperature of the bath is such as to remelt the underface of the ribbon to impart heat in compensation for the loss of heat suffered by the glass during the formation of the ribbon 16 between the rolls 13, 14.

Thus a temperature gradient may be produced in the bath causing first a re-melting of the underface, during which the smooth surface of the molten metal will be transmitted to the glass, and thereafter a chilling thereof so that the hot molten glass is thermally treated to reach the stiffened condition which enables the ribbon to be moved on to and carried by the supporting rollers 17 without harming the lustre obtained by the glass moving over the smooth surface of the bath.

Experiments have shown that the temperature in the headspace of the structure may be sufficiently high to produce a lustre equivalent to a "fire finish" on the upper surface of the glass, but to ensure the maintenance of the necessary temperature conditions in the headspace thermal regulators indicated at 19 may be provided, and the thermal effect may vary through the length of the headspace to produce thermal conditions therein corresponding to the thermal conditions in the bath. The temperature regulators employed may be radiant heaters of known form disposed in the headspace so as to produce the desired thermal treatment on the upper surface of the ribbon.

The production of a temperature gradient in the bath may be obtained by stepping the floor of the bath as indicated at 20 in Figure 3, so that the exit end of the bath is relatively deep as compared with the entry end, and by disposing electrodes 21 at each end of the bath, the electrodes being connected in an electrical circuit adapted to regulate the potential difference beween the electrodes as will be well understood by those skilled in the art.

An alternative stepped tank construction devised to produce a desired temperature gradient in the bath is shown in Figure 4. In this form of construction, the step 20 produces a well 22 served by heaters 18, providing sufficient heat to glaze the surface of the ribbon. By such construction a relatively deep body of molten metal is provided, thereby accelerating the surface melting of the entering ribbon 16, and in such case the more shallow part of the tank is of sufficient length to effectively chill the glass so that the surfaces reach the stiffening stage before leaving the bath.

From the foregoing description, it will be observed that the well constitutes a heating section, and that the more shallow part is the cooling section in which the glass is stiffened. Moreover, as clearly shown in Figure 4, the inclination of the ribbon entering the tank may be such that the ribbon becomes submerged in the bath, hence there is quickly obtained a glazing of both surfaces of the ribbon due to the contact of the metal of the bath with the whole of the ribbon surface.

Instead of employing customary ribbon forming means as already described, the ribbon may be produced by flowing the molten glass from a spout 12 on to a casting roll 14, associated with edge rolls 23 for the ribbon (see Figure 5), so that the ribbon formed on the casting roll is engaged by the edge rolls 23 whereby the marginal zones are immediately chilled and the ribbon driven forwardly by the edge rolls over the rollers 15 (or an apron as the case may be) towards the tank.

Although the invention so far described has been illustrated in relation to the employment of the invention in the manufacture of a continuous ribbon of glass, the invention can be employed to produce a lustre equivalent to a "fire finish" on glass in ribbon form which has been annealed whether or not the glass has been subjected to a limited surfacing operation to produce flatness after leaving the lehr. In such circumstances the bath is regulated as regards its temperature so as to re-melt the surfaces of the glass and then chill the surfaces until they are reset, thereby a lustre equivalent to "fire finish" is readily obtained on both faces.

Referring now to the construction shown in Figures 6 to 10:

In such construction the tank 1, the bath 2 and the headspace 7 are physically partitioned into three aligned sections, namely a heating section, a transfer section and a cooling section, through which the headspace and the bath extend.

In the heating and the cooling sections the roof 4 forms the floor of a flue 24, within which is disposed the ducting 10 which feeds a non-oxidising gas into the headspace 7, the arrangement being such that the gas is preheated by heat exchange through the wall of the ducting. As shown in Figure 6, the flue is provided with an inlet 25 through which a flame and hot gases from a burner (not shown) are introduced into the flue, and the flue is provided with an outlet 26, thus the whole of the ducting 10 is enveloped in the hot gases within the flue.

To vary the extent of heat exchange between the flue gases and the non-oxidising gas passing through the ducting 10, one or more additional outlets such as 27, are provided to reduce the path of the hot gases between the inlet and the outlet of the flue. Each outlet, such as the outlet 27, is provided with an obturator, for example, a movable tile 28, which when in the position shown in Figure 6 closes the outlet, and on being moved from the position shown, opens the outlet.

The gas supplied to the headspace 7 is admitted into the ducting 10 through an inlet indicated at 29, thus the headspace is charged with a hot non-oxidising gas. Conveniently, the gas supplied into the headspace is ordinary coal gas, thus providing a reducing atmosphere in the headspace, the gas being supplied at a pressure which creates a plenum in the headspace. Such reducing atmosphere is necessary when the bath is constituted mainly of molten tin.

By constituting the roof 4 as the floor of the flue, the roof is directly subjected to the heat of the flame and gases, and accordingly directs an even radiant heat through the headspace on to the ribbon floating below the roof.

As most clearly shown in Figures 7 and 8, the regulation of the heat in the molten tin beneath the glass is attained by applying heat to a pair of side lanes constituted in the bath as hereinafter described, and allowing the heat delivered to the side lanes to be conducted through the bath into the intermediate lane through which the ribbon travels.

In the drawings, the lane through which the ribbon passes is disposed centrally of the tank 1 and is defined by longitudinal walls 30 depending from the roof structure 4 into the molten bath 2.

The side lanes are indicated by the reference 31, and the reference 32 indicates burners which direct a flame and burnt gases horizontally into the side lanes.

If the metal employed is a readily oxidisable metal such as tin, a protective layer 32a is formed on the metal in the side lanes, for example, a layer of floating refractory tiles sealed together by molten glass. Thus the heat is imparted to the molten metal in the side lanes without oxidation of the molten metal, and the heat required in the central lane is conducted from the side lanes under the longitudinal walls 30 to the molten metal under the glass being treated in the middle lane defined between the walls 30.

The central lane, as clearly shown in Figure 8, is wider than the width of the ribbon so as to give good clearance between the ribbon and the longitudinal walls defining the central lane.

The ribbon is formed by flowing molten glass from a spout 12 of a melting furnace to the pass between sizing rolls 13, 14 (see Figure 6), from between which the ribbon 16 emanates and is carried by the supporting rollers 15, or an apron, to the central lane in the bath 2.

The hot gases supplied to the two side lanes are evacuated through respective shafts 33.

After the glass ribbon 16 has been thermally treated in the central lane of the heating section of the apparatus, the glass passes into a middle section herein referred to as a "transfer" section, the function of which is to introduce a medial thermal stage between the heating section and the cooling section from which the chilled ribbon emerges at the outlet 9.

At the entrance to and at the exit from the transfer section is disposed a vertically adjustable shutter 34 which is suitably supported in the roof 4 by means not shown and may be similar to the adjusting means for the weir hereinafter referred to, but which will be readily understood. The height of the shutters determines the amount of heat transferred from the headspace in the heating section to the headspace in the transfer section, and the amount of heat leaving the transfer section and entering the cooling section. By such intermediates transfer section a thermal regulation is achieved preventing sudden changes in temperature in the headspace 7, and forming a temperature gradient therein.

To regulate the heat drop in the bath between the heating and cooling sections, a weir 35 is disposed in juxtaposed relation with each shutter. Each weir, as clearly shown in Figure 10, is suspended from the roof 4 by rotatable threaded adjusting elements indicated at 36. By adjusting the height of the weir in the bath, the transfer of heat from the heating section to the middle section is regulated. In the drawing the weir is shown in a mid-position of adjustment. Additional weirs and shutters (not shown) may be employed between the weir 35.

From the foregoing it will be appreciated that the weirs operate in a manner somewhat similar to that step 20 shown in Figure 4.

When compared with the construction diagrammatically illustrated in Figures 1 to 5, it will be observed that the transfer section is really part of the cooling section of the bath, being a readily regulatable portion thereof capable of physically separating the heating and cooling sections save for the surface of the bath in which the glass is floated.

By providing the transfer section defined between the shutters 34 in the central lane of the bath, a temperature difference between the transfer section and the heating and cooling sections may be precisely regulated.

From the foregoing description, it will be clear that the apparatus illustrated in Figures 6 to 10 provides an elongated bath of molten metal over which the atmosphere is confined by a tunnel extending along the full length of the central lane in the bath, through which the ribbon travels, and that the temperature in the molten metal below the ribbon and the temperature in the headspace above the ribbon can be precisely regulated so as to obtain corresponding conditions above and below the ribbon. Thus, the surface of the glass can first be glazed and then progressively cooled until the surface is sufficiently stiffened to pass unharmed at the exit end 9 onto the rollers 17, the glass having a lustre comparable with a "fire finish." It will be appreciated that a ribbon of glass, can be produced by using such apparatus at a linear speed at least as great as that at present achieved in the manufacture of rolled glass, and accordingly, the molten bath apparatus described can also be used as a means of cooling plate glass emanating from the customary rolls without any loss of linear speed in production.

It will further be appreciated that the thermal change effected in the glass in its passage through the cooling section may minimize or eliminate the necessity of using the customary lehr.

As indicated in Figure 6, the shutter 40 may be disposed at the inlet end of the central lane over the bath to eliminate the escape of gaseous atmosphere over the bath between the roof 4 and the ribbon 16 passing over the bottom roller 15.

By the present invention, flat glass similar to the drawn glass known as "window glass" can be produced at the same rate as rolled glass which is a much greater rate than can be achieved by the known drawing methods wherein the speed of production is directly related to the viscosity of the glass, and rolled glass can be produced with a lustre equivalent to fire finish at the annealing stage. Moreover, the invention permits the rapid production of a ribbon of glass of a slow setting composition with exceptional flatness and lustre.

From the nature of the construction described it will be apparent that many changes may be effected without departing from the present invention, for example, the longitudinal walls 30 may be supported at intervals by pedestals 37 disposed on the floor of the tank in spaced relation to give sufficient support to the walls 30 and at the same time permit adequate conduction of heat from the side lanes to the central lane. Moreover, an additional regulation of the headspace of the transfer section may be achieved by forming an outlet 38 in the roof 4 and providing a movable tile 39 to regulate the effective area of the opening 38.

Apparatus constructed according to the invention for the production of a lustrous finish on the top surface only of a rolled glass may incorporate heating means disposed above the ribbon for producing a fire finish on the supper surface, and in such construction the ribbon of glass during its passage along the bath may pass under heating means constituted by a heating chamber in which a sheet of flame is produced.

To this end, a refractory hood structure may be erected over the bath and disposed so that the ribbon floating on the bath can pass under the hood, forming therewith a substantially closed heating chamber, the hood structure comprising means for forming a sheet of flame within the chamber and for directing the flame so that the surface of the glass is swept thereby, and thereafter subjecting the surface to a heat exchange with air to set the surface.

When the thermal condition of the bath is such as to produce a lustrous finish on the underface, additional heating for the top surface may be found unnecessary since such condition produces a lustrous finish on the top surface as well.

Such construction is diagrammatically illustrated in Figure 11 in which the refractory hood structure is generally identified by the reference 41, the hood being of rectangular shape in plan and supported on the end wall of the entry end of the bath and the contiguous parts of the side walls of the tank. The hood structure extends across the full width of the ribbon 16 issuing from the rolls 13, 14 and is suspended by chains 42 coupled to joists 43 forming part of the hood structure. The chains are associated with hoisting gear, not shown, which allows the hood structure to be raised from the bath when desired, or lowered into the operative position shown in Figure 11, that is to say, immediately over the glass. The side walls 44 of the roof structure overlap the side walls of the tank and closely approach the marginal edges of the buoyant ribbon of glass as clearly shown at 45 in Figure 12, the object of the overlap being to screen the surfaces of the bath exposed to each side of the ribbon against access thereto by oxidising gases generated in the refractory hood structure. The roof structure comprises in addition to the side walls 44, roof 46 and two end walls 47, 48, the roof having wide slots 49 in which are located burners 50 each adapted to produce a sheet of flame which sweeps the upper surface of the ribbon exposed within the chamber defined by the roof and the walls of the structure. The general flow of the flames is indicated by the arrows 51, from which it will be appreciated that the flame from each burner moves in substantial parallelism with the ribbon 16.

Each burner 50 has a slot 52 so that each burner produces a sheet of flame which progressively sweeps the surface of the moving ribbon of glass, the burners being fed with the gas for combustion with which air is admixed as desired, through the gas main 53 and branches 54. The end wall 48 of the hood structure comprises the outlet for the products of combustion indicated by the reference 55, the actual outlet of which may be regulated by a moveable tile, not shown. Thus, there is provided over the ribbon 16 at the entry end of the bath, a virtually closed heating chamber defined by the walls 44, 47, 48 and the roof 46, the roof providing a virtual floor to the chamber.

In the construction shown in Figures 11 and 12, thermal regulating means, indicated at 18, may be incorporated to maintain a required relatively low temperature, e.g. from 300° C. to 600° C. for the molten tin so that so far as the underface of the ribbon is concerned, it is cooled and eventually sufficiently stiffened before leaving the bath. Beyond the hood structure in the direction of movement of the ribbon the thermal regulating means 18 may be cooling means for the bath. Temperature controlling means 19 may be employed in the headspace beyond the hood structure in the direction of movement of the ribbon for regulating the temperature of the atmosphere in the headspace.

The upper surface of the ribbon is thus thermally treated by the flames sweeping thereover to cause a surface melting of the ribbon, which melted surface is eventually chilled so that a lustrous finish is maintained on the surface of the ribbon.

Accordingly, the present invention comprises the combination with a tank confining a bath of molten metal adapted to receive and buoyantly support a ribbon of glass as it is advanced from the ribbon forming means of a superstructure including a heating chamber at the inlet end of the tank and a tunnel between the heating chamber and the exit end of the bath, the heating chamber having burners adapted to provide sheets of flame which sweep the upper surface of the glass when exposed in the chamber, thermal regulating means associated with the bath whereby the ribbon receives a desired thermal treatment, and a conveying support for the ribbon as it emerges from the bath after the completion of the thermal treatment. The superstructure may include side walls which overlap the corresponding tank walls, the overlaps being disposed so as to closely approach the marginal areas of that part of the moving ribbon of glass passing under the superstructure thereby screening the molten metal from the heating gases.

The present invention produces a flat glass having a lustrous finish produced according to any of the methods of manufacture herein described, in particular a rolled window glass having a lustrous finish.

In the appended claims, reference is made to the forming of a ribbon of glass to definite dimensions of width and thickness, and cooling of the ribbon to an extent sufficient to make it stiff enough to stabilize its dimensions, before the glass reaches the bath of molten metal. Such stable condition of the glass in ribbon form is produced, for example, when molten glass is flowed onto a cooled metal roll to cast the ribbon on the roll or when the molten glass is flowed in conventional manner through the pass between a pair of cooled sizing rolls, the cooling of the glass in its ribbon form being effected in both cases by heat exchange with the casting roll or the sizing rolls as the case may be.

The present invention is to be distinguished from prior art disclosures according to which a glass ribbon is formed by flowing the molten glass directly upon the surface of a molten metal bath and gradually cooling the glass by contact with the molten metal as the glass is advanced along the surface thereof. Such prior art processes do not possess the advantages which characterize the present invention and which have been fully set forth in the preceding detailed description.

We claim:

1. A method of manufacturing flat glass in ribbon form, comprising the steps of forming a ribbon of glass to definite dimensions of width and thickness, cooling the ribbon to an extent sufficient to make it stiff enough to stabilize its dimensions, thereafter directing the stiffened ribbon onto a bath of molten metal, floating the ribbon thereon and advancing the ribbon horizontally in continuous form along the bath of molten metal, the surface of said molten metal being wider than the width of the ribbon, and while said ribbon is being advanced along said bath protecting the surface of the molten metal in the bath beyond the margins of said ribbon against oxidation, while regulating the temperature of the molten metal in the bath to first cause a surface of the advancing stiffened ribbon to be softened and then to progressively and sufficiently cool the softened ribbon before leaving the bath by heat exchange therewith to permit the ribbon to be advanced by mechanical conveying means without becoming damaged.

2. The method of manufacturing flat glass as described in claim 1, characterized by maintaining a temperature gradient in the bath to cause said surface of the stiffened ribbon to be softened to the extent of being melted.

3. The method of manufacturing flat glass as described in claim 2, characterized in that the thermal conditions maintained in the bath and over the bath are such, that during the passage of the stiffened ribbon along the bath, a similar superficial melting of both ribbon surfaces occurs before the cooling treatment, so that the cooling treatment is effected on the melted glass surfaces and a fire finish of both surfaces is obtained.

4. A method of manufacturing flat glass as described in claim 1, characterized by producing the required temperature in the bath of molten metal by applying heat to a lateral lane of the bath and transferring heat from the lateral lane by conduction and convection through the bath to that part of the bath along which the glass ribbon is floating.

5. Apparatus for use in producing flat glass comprising means for progressively forming a ribbon of glass to definite stabilized dimensions of width and thickness, a tank structure extending in the direction of movement of the stiffened ribbon, a bath of molten metal in said tank structure disposed to receive and float the ribbon as it is advanced from said forming means, the tank structure having a configuration such that at the intended level for the passage of the ribbon along the bath, the width of the bath is greater than the intended width for the ribbon, a tunnel bridging the bath, end and side wall elements to said tunnel segregating a head space over the bath, ducting for admitting chemically suitable gas into said tunnel, temperature regulating means for the bath for first causing the lower surface of the advancing stiffened ribbon to be softened and then progressively and sufficiently cooling the softened ribbon before leaving the bath by heat exchange therewith to permit the ribbon to be discharged from the bath and advanced therefrom without damage, the end wall element at the discharge end of the bath forming with the tank structure an outlet for the ribbon, and conveying supports for the ribbon as it emerges from the bath.

6. An apparatus for producing flat glass, comprising means for progressively forming a ribbon of glass to definite stabilized dimensions of width and thickness, a tank containing a bath of molten metal disposed to receive and float the stiffened ribbon as it is advanced from said forming means, said stiffened ribbon being adapted to move along said bath from an inlet end to an outlet end, and means for regulating the temperature of the bath to subject the stiffened ribbon moving along said bath to thermal conditions causing the lower surface of the ribbon first to soften and then the ribbon to sufficiently and progressively cool before leaving the bath to permit the ribbon to be discharged from the bath without damage.

7. An apparatus for producing flat glass as described in claim 6, comprising a tunnel bridging the bath, duct means for admitting a non-oxidizing gas to the tunnel, and means for regulating the temperature of the gas within the tunnel to correspond with the regulation of the temperature of the bath.

8. An apparatus for producing flat glass as described in claim 6, wherein the temperature of the bath is such as to impart sufficient heat to the molten metal near the inlet end of the bath to which the stiffened ribbon is fed to cause said ribbon surface in contact with the bath to be softened to the extent of being melted before being cooled while moving along said bath.

9. Apparatus for manufacturing flat glass as described in claim 6, the tank comprising parallel longitudinal walls extending along the length of the tank and dipping into the molten metal to segregate a center surface lane of the bath along the length of the tank and the path of the moving ribbon from flanking side surface lanes, and means for heating the molten metal under said surface side lanes, the heat applied to the molten metal beneath said side lanes being transmitted to the molten metal beneath said center lane by conduction and convection through the bath.

10. Apparatus for manufacturing flat glass, comprising means for forming a ribbon from molten glass over a hard surface, means for continuously moving the ribbon longitudinally as it is formed, with the surface which contacted said hard surface facing downward, means for buoyantly supporting the moving ribbon after it has been formed, comprising a tank holding a bath of molten metal, the tank comprising parallel longitudinal walls extending along the length of the tank and dipping into the molten metal to segregate a surface lane of the bath along the path of the moving ribbon from the bath surface outside the lane, a roof connecting said walls to form therewith a tunnel along which the ribbon moves, heating means directing heat onto the roof, whereby radiant heat is directed from said roof onto the bath, and heating means for the molten metal outside the lane, whereby the heat imparted is conducted through the bath to the molten metal in the lane.

11. An apparatus as described in claim 10, comprising a flue for hot gases having said roof as a floor, said flue including a duct having an inlet connected to a supply of non-oxidizing gas and having its outlet end extending through said roof and discharging into the headspace between said roof and the bath along which the ribbon moves, said flue being in heat exchange relationship with said heating means to heat the entering gas.

12. An apparatus for producing flat glass comprising sizing rolls defining therebetween a pass through which molten glass is continuously delivered to form continuously a continuous ribbon of definite dimensions of width and thickness and made stable by cooling it sufficiently to make it stiff enough to retain its dimensions, said ribbon being continuously advanced from said rolls and by said rolls longitudinally as it is formed by said rolls, a tank located forwardly of said rolls in position to receive the stiffened ribbon as it is advanced from said rolls, said tank containing a bath of molten metal with a specific gravity greater than that of the ribbon to float the stiffened ribbon therein delivered to said tank, said ribbon being adapted to be moved along said bath as the ribbon is being buoyantly supported thereby, means for controlling the temperature of the bath to first melt a surface of the stiffened ribbon by the heat in the bath and then to sufficiently cool the ribbon by heat exchange with the bath before it leaves the tank to permit said ribbon to be discharged from said tank without damage, and mechanical conveying means for the ribbon at the outlet end of the tank.

13. A method of manufacturing flat glass in ribbon form comprising the steps of forming a ribbon of glass to definite dimensions of width and thickness, cooling the ribbon to an extent sufficient to make it stiff enough to stabilize its dimensions, thereafter directing the stiffened ribbon to a bath of molten metal and advancing the ribbon along the bath, and regulating the temperature of the molten bath first to cause a surface of the stiffened ribbon to become softened and then the ribbon to be progressively and sufficiently cooled before leaving the bath to permit the ribbon to be advanced from the bath by mechanical conveying means without becoming damaged.

14. A continuous method of manufacturing flat glass comprising the steps of progressively forming a ribbon of glass from a molten supply to definite dimensions of width and thickness, cooling the ribbon to an extent sufficient to make it stiff enough to stabilize its dimensions, thereafter directing the stiffened ribbon to a bath of molten metal and advancing it along said bath under thermal conditions which cause the progressive melting of a surface of the ribbon while avoiding the melting of the main body of the ribbon, and thereafter progressively cooling the melted surface of the ribbon until said surface is sufficiently cooled to avoid damage by contact with mechanical conveying means.

References Cited in the file of this patent

UNITED STATES PATENTS

| | | |
|---|---|---|
| 710,357 | Heal | Sept. 30, 1902 |
| 789,911 | Hitchcock | May 16, 1905 |
| 1,564,240 | Hitchcock | Dec. 8, 1925 |
| 1,735,595 | Blair | Nov. 12, 1929 |
| 2,033,261 | Stewart | Mar. 10, 1936 |
| 2,125,912 | George et al. | Aug. 9, 1938 |